United States Patent [19]
Grob

[11] 3,745,470
[45] July 10, 1973

[54] PULSE TRANSMITTER CIRCUIT FOR MEASURING INSTRUMENTS

[75] Inventor: Russel W. Grob, Metamora, Ill.
[73] Assignee: Caterpillar Tractor Co., Peoria, Ill.
[22] Filed: May 28, 1971
[21] Appl. No.: 147,767

[52] U.S. Cl. .................. 328/38, 328/127, 328/60
[51] Int. Cl. ............................................ H03k 5/00
[58] Field of Search ............... 328/38, 20, 60–61, 328/74, 127; 307/215

[56] References Cited
UNITED STATES PATENTS

| | | | |
|---|---|---|---|
| 3,504,288 | 3/1970 | Ross | 328/61 |
| 2,830,191 | 4/1958 | McCollom | 328/38 |
| 3,333,205 | 7/1967 | Featherston | 328/74 |
| 3,571,725 | 3/1971 | Kaneko | 307/215 |
| 3,530,384 | 9/1970 | Zussman | 307/215 |
| 3,566,159 | 2/1971 | Plunkett | 328/20 |
| 2,600,185 | 6/1952 | Ballard | 328/38 |
| 3,487,204 | 12/1969 | Emmerich | 328/127 |

OTHER PUBLICATIONS

Marsocci "Survey of Semiconductor Devices" pages 31–37 Jan. 1961 Semiconductor Products Vol 4 No. 1

*Primary Examiner*—John W. Huckert
*Assistant Examiner*—Ro E. Hart
*Attorney*—Fryer, Tjensvold, Feix, Phillips and Lempio

[57] ABSTRACT

A compact, economically manufactured circuit for generating and transmitting pulses in response to predetermined increments of rotation of an element of a fluid flow meter has a photosensitive component detecting rotation of the meter element. Additional components, including an operational amplifier and logic gates, amplify and shape the signals from the photosensitive component and double the signal frequency to achieve a high pulse frequency capability, uniform pulse shape, good resolution and reliable operation in the presence of severe environmental conditions around the flow meter.

5 Claims, 1 Drawing Figure

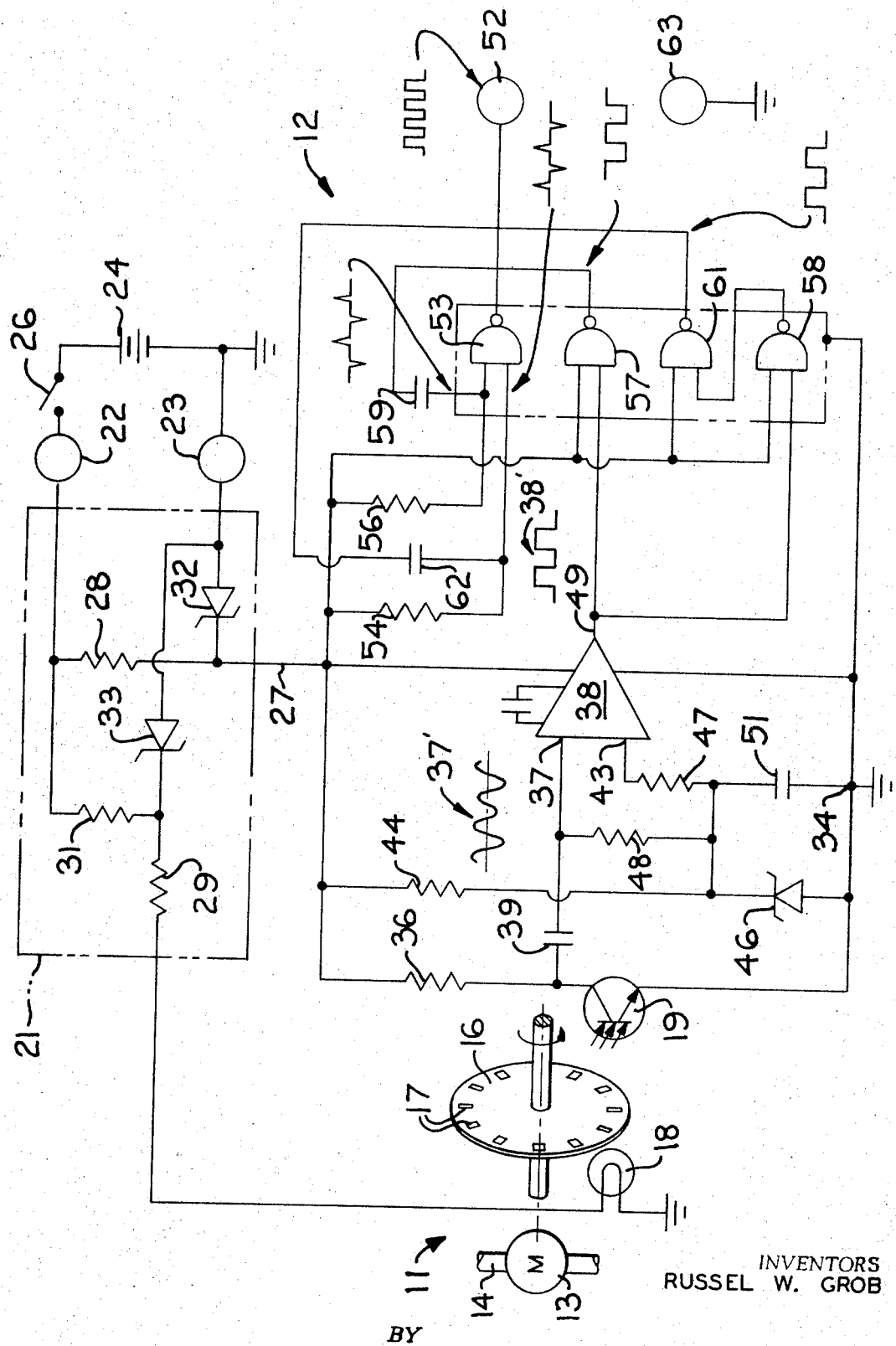

PULSE TRANSMITTER CIRCUIT FOR MEASURING INSTRUMENTS

BACKGROUND OF THE INVENTION

This invention relates to measuring instruments of the form providing recurrent electrical pulses indicative of measured data and more particularly to circuits for generating the repetitive electrical pulses which represent the data measured by an instrument of this form.

Many instruments for monitoring a physical phenomenon produce a series of electrical pulses in order to transmit the detected information to a recording device, or digital data processing system or the like. One specific example of such an instrument is described in co-pending application Ser. No. 135,300 of Albert B. Niles et al. for Method and Apparatus for Checking Engine Performance, filed Apr. 19, 1971 and assigned to the Assignee of the present application. This co-pending application describes apparatus for determining the power output, in terms of brake horsepower or the like, of an internal combustion engine. Power output of the engine is determined in part from electrical signals generated at a volume measuring flow meter connected into the fuel lines of the engine under test. To provide accurate power computations, the degitizing flow meter must reliably produce a uniform output pulse in response to each predetermined increment of rotation of an element of the meter which is turned by the fuel flow therethrough. These output pulses, in the meter of the co-pending application, are initiated by passage of radial slits in a rotating disc across the optical path between a light source and a photosensitive element.

In the above described instrument as well as in many others, it may be desirable that output pulses be produced at a frequency greater than the rate of recurrence of the events which initiate the output pulses. In the particular example discussed above, mechanical factors limit the number of radial slits which can be provided in the disc to a value less than the number of output pulses which are desired for each revolution of the disc. Accordingly the output pulse generating circuit should be capable of multiplying pulse frequency. To provide maximum accuracy and reliability still other conditions must be met. Output pulses should have a uniform wave shape and amplitude which are not sensitive to variations in the characteristics of the event which initiates the pulses. In the example discussed above such variations may result from differences in speed of rotation or because of inconsistencies in slit width and changing optical distance of the slit, due to irregular movements of the rotating disc, between the light source and photosensitive element, causing the element's output to vary. Further, the pulse generating circuit may be physically associated with the measuring instrument rather than the remote data processing equipment and thus may be subjected to difficult environmental factors. In the specific example discussed above, the flow meter including the pulse generating circuit is attached to an operating engine and thus must operate reliably in the presence of high temperatures, severe temperature fluctuations and vibration.

Prior circuits for performing a similar function have not met these criteria to the desired degree either in the specific context discussed above for purposes of example or in conjunction with other measuring operations wherein repetitive pulse signals are required from a measuring instrument.

SUMMARY OF THE INVENTION

This invention provides a compact, low cost, environmentally insensitive circuit which reliably generates and transmits uniformly shaped high amplitude output pulses in response to successive increments of a measured quantity wherein output pulse frequency is multiplied relative to the rate of occurrence of events which initiate the output pulses. In a preferred form, the invention uses a photosensitive component to sense movement of an element of a measuring instrument and the signal from the photosensitive component is interpreted, amplified, increased in frequency and transmitted by circuit means including an operational amplifier and logic gates in a novel arrangement having the properties discussed above.

Accordingly it is an object of this invention to facilitate the coupling of data recording or processing devices to measuring instruments which provide input data therefor.

The invention, together with further objects and advantages thereof, will best be understood by reference to the following description of a preferred embodiment and by reference to the accompanying drawing.

BRIEF DESCRIPTION OF THE DRAWING

The accompanying drawing is a schematic diagram of an exemplary embodiment of the pulse generating and transmitting circuit as associated with a fluid flow meter which is shown diagramatically in the drawing.

DESCRIPTION OF A PREFERRED EMBODIMENT

Referring now to the drawing, the flow meter 11 with which pulse transmitting circuit 12 is associated in this example of the invention may be of known construction and accordingly is shown only diagramatically in the drawing. Such a meter 11 may consist essentially of a rotary fluid motor 13 connected into a flow conduit 14 whereby the motor is turned by the fluid flow at a rate proportional to the magnitude of the flow. In one common form of digitizing flow meter 11 the motor 13 turns a disc 16 having a series of equiangularly spaced radial slots 17. Transducer means are provided to generate an electrical signal indicative of the amount of rotation of motor 13 and disc 16 and thus indicative of the amount of fluid which passes through the meter. The transducer may consist of a light source 18 disposed at one side of disc 16 and a photosensitive component such as a phototransistor 19 situated at the opposite side of the disc to receive light transmitted through the slits 17. Thus the light intensity reaching phototransistor 19 increases momentarily each time that a slit 17 passes across the optical path between the source 18 and the phototransistor.

To energize the light source 18, phototransistor 19 and elements of pulse transmitting circuit 12, with constant operating voltages, a power supply circuit 21 is provided. Power supply circuit 21 includes a positive DC power input terminal 22 and grounded negative terminal 23 for connection to a suitable unregulated DC power supply which may, for example, be a remotely situated battery 24 connected across terminals 22 and 23 in series with a control switch 26. Operating power for pulse transmitting circuit 12 is supplied to a B+ conductor 27 thereof through a resistor 28 which connects conductor 27 to terminal 22. To energize light source 18, one terminal of the source is grounded while the other connects to power supply terminal 22 through a pair of series resistors 29 and 31. To assure that a constant DC voltage is applied to B+ conductor 27 a zener diode 32 is connected between the B+ conductor and negative power supply terminal 23. To assure that a constant lower voltage is provided for the light source 18, a second zener diode 33 is connected between the junction of resistors 29 and 31 and terminal 23. Resistors 29 and 31 serve to provide a lower voltage to light source 18 than is provided to the pulse circuit B+ conductor 27 inasmuch as in this example the light source is designed to operate with less votage than certain components in the pulse transmitter circuit.

To energize the phototransistor 19, the emitter thereof is connected to a circuit ground conductor 34 while the collector of the phototransistor connects to B+ conductor 27 through a dropping resistor 36. Conductivity through the phototransistor 19 is a function of the intensity of the ambient light and accordingly the voltage at the collector of the phototransistor drops momentarily each time that a slit 17 of disc 16 passes between light source 18 and the phototransistor.

The major functions of the pulse transmitting circuit 12 are to detect, amplify, multiply, shape and transmit the collector signals at phototransistor 19 which result from rotation of disc 16. For this purpose, the voltage fluctuations at the collector of phototransistor 19 are coupled to the input signal terminal 37 of an operational amplifier 38 through a capacitor 39. Thus the voltage at input terminal 37 of operational amplifier 38 drops momentarily each time a slit of disc 16 crosses the optical path between light source 18 and the phototransistor 19 as illustrated by wave shape 37' in the drawing. During each such drop the voltage passes through a reference voltage value which is 5 volts in this instance. Operational amplifier 38 is connected to function as a zero crossing detector to respond to the momentary voltage drops at terminal 37 by producing amplified positive substantially square wave pulses ranging from 0 to 10 volts, as indicated by wave shape 38' in the drawing. For this purpose the positive and negative power terminals of operational amplifier 38 are connected to conductors 27 and 34 respectively and a fixed reference voltage of 5 volts, in this instance, is established at the other amplifier input terminal 43. To provide the reference voltage, a resistor 44 and zener diode 46 are connected in series between B+ conductor 27 and ground conductor 34 and in accordance with the well known action of a zener diode, the desired fixed potential is maintained at the junction between the diode and the resistor 44. Such junction is connected to the reference input 43 of amplifier 38 through a resistor 47 and is connected to input 37 through a resistor 48. Thus in the absence of a voltage change at phototransistor 19, the same potential is present at both inputs of the amplifier and no signal is present at the output 49 thereof. When capacitor 39 transmits a voltage drop at the phototransistor 19 to input 37, the potential at input 37 momentarily fluctuates with respect to the potential at reference input 43 and an amplified output pulse is produced at output 49. To supress transient voltage fluctuations at amplifier input 43 a capacitor 51 is connected across the terminals of zener diode 46.

Accordingly as successive ones of the slits 17 of disc 16 sweep past the optical path between the light source 18 and phototransistor 19 a sequence of square wave pulses is generated at the output 49 of operational amplifier 38 at a frequency proportional to the speed of rotation of the disc. In order to provide for increased accuracy and resolution in digital data processing circuits with which this system may be used, means are provided for doubling the frequency of such output pulses 38' prior to transmission to the associated pulse utilizing circuits. Accordingly the output of amplifier 38 is coupled to a flow signal transmitting terminal 52 through a frequency doubling means. For this purpose an output NAND gate 53 has an output coupled to terminal 52 and has first and second inputs coupled to B+ conductor 27 through similar resistors 54 and 56 respectively. Thus when the amplifier 38 output is not affecting the output gate 53 as will hereinafter be described, equal potentials are present at both inputs of the gate and in accordance with the well known operation of a NAND gate no signal is present at the output thereof. To cause gate 53 to generate two discrete uniform square wave pulses for each pulse from the output of amplifier 38, the amplifier output conductor 49 is branched to connect with one input each of a second and third NAND gate 57 and 58. The output of NAND gate 57 is connected through a capacitor 59 to one input of gate 53 while the output of gate 58 is connected to the other input of gate 53 through a fourth NAND gate 61 and capacitor 62.

The NAND gates 57, 58 and 61 are here used to function essentially as inverters and accordingly the other inputs to each of these three NAND gates are connected to B+ conductor 27. With one input permanently high a NAND gate acts simply to invert signals applied to the other input. NAND gates are used to provide the inversion function in part since compact integrated circuit elements are available which embody four NAND gates. This is simpler and less costly than a circuit including an individual NAND gate 53 and three discrete inverters. Moreover, as will become evident from the description of the operation of the frequency doubling portion of the circuit, the structural similarity of the four elements 53, 57, 61 and 58 assures production of uniformly shaped and spaced output pulses as required for optimum operation of associated digital circuits or the like.

In the absence of an output signal from amplifier 38, both inputs of NAND gate 53 are at equal voltages and the output of NAND gate 53 is therefore low. The output of NAND gate 57 is high while the output of NAND gate 61 is low but owing to the presense of capacitors 59 and 62 these signals do not affect NAND gate 53 as long as there is no change in such signals. When an output pulse 38' is produced by amplifier 38, the leading edge of such pulse causes the output of NAND gate 57 to drop to a low condition while the output of NAND gate 61 is caused to rise to a high condition owing to the inverting action of the several NAND gates 57, 58 and 61. Capacitor 59 and resistor 56 is conjunction and capacitor 62 and resistor 54 in conjunction each act as a differentiator causing the voltage changes at the outputs of NAND gates 57 and 61 respectively to be applied to one input of NAND gate 53 as a positive voltage spike while simultaneously applying a negative voltage spike to the other input of NAND gate 53. Accordingly, the output of NAND gate 53 briefly goes high to produce a first substantially square wave brief output pulse at transmitting terminal 52. Subsequently, when the trailing edge of the amplifier output pulse 38' occurs, the outputs of NAND gates 57 and 61 revert to the original condition. Through the differentiating action of the capacitors 59 and 62 and resistors 54 and 56 this again applies brief oppositely directed voltage spikes to the two inputs of NAND gate 53 causing a second output pulse at transmitting terminal 52.

Accordingly each output pulse from amplifier 38 produces a pair of discrete sequential circuit output pulses at transmitting terminals 52 to achieve the desired multiplying of the original frequency. Moreover as the output pulses at terminal 52 are derived through enabling and disabling of the NAND gate 53, such pulses are highly uniform, distinct and of a substantially square wave configuration. It will be apparent that if multiplication of the original frequency by a factor greater than two is desired, essentially similar stages of the frequency doubling portion of the circuit may be connected in tandem between amplifier 38 and transmitting terminal 52 as necessary.

While it might appear at first consideration that the passage of amplifier 38 output pulses through first one inverting device and then another, specifically NAND gates 58 and 61 in this example would in effect restore the pulses to the original condition making the presence of gates 58 and 61 seemingly redundant, this is not the case in practice. Pulses in one branch of the output of amplifier 38 are inverted in passing through gate 58 and if the pulses in the other branch were passed directly from amplifier output 49 to capacitor 62 there might be an imbalance in the shape of the voltage spikes applied to the two capacitors 59 and 62. Thus signals to both of capacitors 59 and 62 are passed through a NAND gate and since the signals in one path should be inverted relative to those in the others, one of the paths is provided with two inverting gates. This aids significantly in realizing the desired objective of uniform output pulses at terminal 52 and in achieving reliable and accurate response at high pulse frequencies.

Accordingly pulses generated by phototransistor 19 are detected, amplified and optimally shaped and applied to signal output terminal 52 at twice the original frequency. Terminal 52, which is paired with a ground terminal 63 so that the pulse transmitter circuit ground may be matched with that of remote signal utilizing apparatus, may be coupled by suitable conductors with any recording or data processing system requiring pulsed input signals having a frequency indicative of the rate of fluid flow through conduit 14. The engine horsepower readout apparatus described in co-pending application Ser. No. 135,300, previously referred to describes one such data processing system.

While the invention has been described with respect to a single preferred embodiment, it will be apparent that numerous modifications are possible and it is not intended to limit the invention except as defined by the following claims.

What is claimed is:

1. A pulse generating and transmitting circuit for responding to a recurrent phenomenon by producing electrical output pulses at a frequency greater than that of said recurrent phenomenon comprising:

transducer means for detecting said phenomenon and for producing an electrical signal in response to each recurrence thereof, an amplifier having an input coupled to said transducer means for receiving said signals therefrom and having an output at which an amplified pulse is generated in response to each of said signals, an output NAND gate means of the form having a pair of inputs and having an output at which a substantially square wave pulse is produced in response to an imbalance of electrical potential at said inputs and at which no pulse is produced when equal electrical potentials are present at each of said inputs, first and second differentiating circuits each being connected between said amplifier output and a separate one of said inputs of said output gate means to define a pair of separate pulse paths between said amplifier output and said output gate means, and means coupled to one of said pulse paths between said differentiating circuit thereof and said amplifier for inverting pulses transmitted to said output gate means through said one pulse path relative to pulses transmitted to said output gate means through said other pulse path, whereby said output gate means produces a pair of output pulses of reduced duration for each output pulse from said amplifier.

2. A circuit as defined in claim 1 wherein said amplifier is an operational amplifier having an input signal terminal receiving said signals from said transducer means and having a reference input to which a fixed voltage is applied which fixed voltage is intermediate between the voltage extremes of said signals from said transducer means and wherein said amplifier output undergoes a transition from a first voltage level to a second voltage level in response to each change of potential at said input terminal through said fixed reference voltage level.

3. A circuit as defined in claim 1 further comprising a DC power supply and wherein each of said first said second differentiating circuits comprises a resistor connected between a single terminal of said power supply and the associated one of said inputs of said output gate means and further comprises a capacitor connected between said associated input of said output gate means and said amplifier output whereby said power supply normally provides equal potentials to said inputs of said output gate means, the potential at one of said inputs of said output gate means being momentarily changed from the potential at the other thereof by the leading edge of each output pulse from said amplifier as received through one of said two pulse paths and the potential at said other of said inputs being momentarily changed from the potential at said one thereof by the trailing edge of said amplifier output pulse.

4. A circuit as defined in claim 1 wherein said means for inverting pulses in one of said pulse paths relative to pulses in the other thereof comprises a first signal inverting means connected into one of said pulse paths and a pair of signal inverting means connected into the other of said pulse paths in series relationship whereby pulses in said other pulse paths are twice inverted whereas pulses in said first pulse path are inverted once said first signal inverting means and said pair of signal inverting means all being substantial'y identical.

5. A circuit as defined in claim 4 wherein each of said signal inverting means are NAND gates substantially identical to said NAND gate output means.

* * * * *